(12) United States Patent
Papajewski

(10) Patent No.: US 9,121,490 B2
(45) Date of Patent: Sep. 1, 2015

(54) METHOD FOR OPERATING A MOTOR VEHICLE WITH A HYBRID DRIVE

(75) Inventor: Jens Papajewski, Unterhausen (DE)

(73) Assignee: AUDI AG, Ingolstadt (DE)

( * ) Notice: Subject to any disclaimer, the term of this patent is extended or adjusted under 35 U.S.C. 154(b) by 96 days.

(21) Appl. No.: 14/116,572

(22) PCT Filed: Apr. 26, 2012

(86) PCT No.: PCT/EP2012/001792
§ 371 (c)(1),
(2), (4) Date: Nov. 8, 2013

(87) PCT Pub. No.: WO2012/152381
PCT Pub. Date: Nov. 15, 2012

(65) Prior Publication Data
US 2014/0076876 A1    Mar. 20, 2014

(30) Foreign Application Priority Data

May 12, 2011    (DE) .......................... 10 2011 101 357

(51) Int. Cl.
*H05B 6/46*    (2006.01)
*H05B 6/64*    (2006.01)
*F16H 57/04*   (2010.01)
(Continued)

(52) U.S. Cl.
CPC .............. *F16H 57/0413* (2013.01); *B60K 6/48* (2013.01); *B60W 30/194* (2013.01); *H01M 10/5006* (2013.01); *H01M 10/615* (2015.04); *H05B 6/802* (2013.01); *B60W 2710/1072* (2013.01); *B60W 2710/246* (2013.01); *F02N 19/10* (2013.01);
(Continued)

(58) Field of Classification Search
CPC ............ F02N 19/10; H05B 6/80; H05B 6/00; H05B 6/46; H05B 6/64; H05B 6/701; B60K 6/00; B60W 20/00; B60H 1/00; B60H 1/03
USPC ......... 219/202, 205, 208, 209, 770, 678–680, 219/687–688; 180/65.21–65.29; 123/142.5, 123/543, 41.01; 165/41–48.1
See application file for complete search history.

(56) References Cited

U.S. PATENT DOCUMENTS 4,388,511 A    6/1983    Sander
5,064,494 A    11/1991   Duck et al.
(Continued)

FOREIGN PATENT DOCUMENTS

DE    2 229 195 A    1/1974
DE    30 197 20 A1   12/1981
(Continued)

OTHER PUBLICATIONS

International Search Report issued by the European Patent Office in International Application PCT/EP2012/001792 on Jan. 28, 2013.

*Primary Examiner* — Dana Ross
*Assistant Examiner* — Michael LaFlame, Jr.
(74) *Attorney, Agent, or Firm* — Henry M. Feiereisen LLC

(57) ABSTRACT

The invention relates to a method for operating a motor vehicle with a hybrid drive (10), in which at least one operating medium of the motor vehicle is heated to a predefined desired temperature by a dielectric heating device (36, 38). In this way, immediately following a cold start of the motor vehicle, components through which the operating medium flows can be brought particularly rapidly to their optimum operating temperature so that a particularly energy-saving operation of the motor vehicle is possible.

2 Claims, 1 Drawing Sheet

(51) Int. Cl.
  *H05B 6/80* (2006.01)
  *B60W 30/194* (2012.01)
  *B60K 6/48* (2007.10)
  *H01M 10/615* (2014.01)
  *F02N 19/10* (2010.01)

(52) U.S. Cl.
  CPC ........... *Y02T 10/6221* (2013.01); *Y10S 903/903* (2013.01)

(56) References Cited

U.S. PATENT DOCUMENTS

| | | | |
|---|---|---|---|
| 7,077,224 | B2 | 7/2006 | Tomatsuri et al. |
| 2002/0068202 | A1* | 6/2002 | Gebhardt et al. ............... 429/13 |
| 2003/0098297 | A1* | 5/2003 | Stemmler et al. ............. 219/205 |
| 2008/0211309 | A1* | 9/2008 | Nolte ............................... 307/66 |
| 2008/0220315 | A1* | 9/2008 | Dougherty et al. ............. 429/53 |
| 2008/0246227 | A1 | 10/2008 | Graf |
| 2009/0015023 | A1 | 1/2009 | Fleckner |
| 2009/0217666 | A1* | 9/2009 | Farkaly ........................... 60/670 |
| 2010/0243969 | A1* | 9/2010 | Rebouillat et al. ............ 252/579 |

FOREIGN PATENT DOCUMENTS

| | | |
|---|---|---|
| DE | 39 03 558 A1 | 8/1990 |
| DE | 197 01 094 A1 | 7/1998 |
| DE | 10 2005 043 818 A1 | 3/2007 |
| DE | 10 2007 032 726 A1 | 1/2009 |
| DE | 10 2007 056 201 A1 | 5/2009 |

* cited by examiner

METHOD FOR OPERATING A MOTOR VEHICLE WITH A HYBRID DRIVE

CROSS-REFERENCES TO RELATED APPLICATIONS

This application is the U.S. National Stage of International Application No. PCT/EP2012/001792, filed Apr. 26, 2012, which designated the United States and has been published as international Publication No. WO 2012/152381 and which claims the priority of German Patent Application, Serial No. 10 2011 101 357.5, filed May 12, 2011, pursuant to 35 U.S.C. 119(a)-(d).

BACKGROUND OF THE INVENTION

The invention relates to a method for operating a motor vehicle with a hybrid drive.

Motor vehicles with hybrid drive have both an internal combustion engine and an electric driving engine. To consume as little fuel as possible, it is hereby desired to use whenever possible only the electric driving engine for operating the motor vehicle or to provide at least a substantial part of the propulsion power by the electric driving engine.

At low ambient temperatures, there is, however, the problem that many components of the motor vehicle do not work efficiently in a cold state. This is especially true for a high-voltage battery for supplying the electric driving engine, because the maximum power that can be drawn in a cold state is significantly less than in a hot state. Also, drive components which need to be lubricated can be operated in cold state only with significant energy losses. This is true in particular for the transmission as a result of the increased viscosity of the transmission oil at low temperatures.

DE 197 01 094 A1 discloses a method in which a coolant of an internal combustion engine is heated to a desired temperature by using a continuous microwave heater. Coolant further flows through a heat exchanger for heating air used for interior ventilation of the motor vehicle. The presence of the microwave heating of the coolant enables the latter to be rapidly brought to its desired temperature so that the waste heat of the internal combustion engine can be used directly for heating other components of the motor vehicle.

It is also known from DE 10 2007 032 726 A1 to use heating resistors to dissipate electric energy, generated in hybrid cars during recuperation mode in the event the battery can no longer absorb more energy, with waste heat being usable for heating components of the motor vehicle, such as engine or transmission.

DE 197 01 094 A1 describes an auxiliary heating for motor vehicles, using a continuous microwave heater for heating a coolant for an internal combustion engine in order to provide sufficient heating output for the interior heating, even when the engine is cold and to bring the engine quickly to operating temperature.

U.S. Pat. No. 7,077,244 B2 discloses a method for starting a motor vehicle, wherein a check is executed before starting the motor vehicle as to whether all the motor vehicle components have reached a predefined minimum temperature. If this is not the case, components that are too cold are preheated and the engine start is permitted only when the predefined minimum temperature has been reached.

DE 2 229 195 A1 discloses a microwave heating for accumulators, with microwaves being radiated directly in the accumulator to bring it to operating temperature.

When hybrid vehicles are involved, there is, however, the problem that in purely electric mode the internal combustion engine does not produce waste heat that could be used for heating other components.

SUMMARY OF THE INVENTION

The present invention is therefore based on the object to provide a method of the afore-mentioned type, by which a hybrid motor vehicle can be operated in an especially energy-efficient manner.

This object is achieved by a method for operating a motor vehicle with a hybrid drive, wherein at least one operating medium of the motor vehicle is heated to a predefined desired temperature by a dielectric heating device through which the operating medium flows, wherein the method includes the steps of: a) ascertaining whether a cold start is present, b) determining the ambient temperature, c) in the presence of a cold start and when falling below a predetermined threshold value for the ambient temperature, d) heating the at least one operating medium.

In such a method, at least one operating medium of the motor vehicle is heated by a dielectric heating device, i.e. a microwave heater, to a predefined temperature. During dielectric heating, the operating medium is irradiated by microwave radiation. Molecules of the operating medium, which have a dipole moment, oscillate hereby with the incident excitation field. As a result of impact processes between the molecules of the liquid, the irradiated energy is evenly dispersed as heat energy in the operating medium. Since this does, in fact, not involve an absorption process, there is no need to precisely conform the frequency of the microwave radiation to the operating medium, so that the method can be implemented with a variety of different media. To permit a particularly efficient heating, it is suitable to provide the receiving space, subject to microwave radiation, with a metallic coating. The latter reflects the microwave radiation so that energy losses due to escaping radiation are avoided.

Dielectric heating is able to directly introduce the energy into the entire irradiated volume. Heating is thus independent of the thermal conductivity of the medium and the container wall that surrounds the medium. As a result, an particularly high heating rate can be realized. For the same reason, the heating rate is substantially independent of the geometry of the liquid-filled space to be heated so that there is no need to specially conform the receiving container for the liquid in order to permit application of the method.

As dielectric heating operates at very good efficiency, the method according to the invention is able to ensure that the operating media of the hybrid motor vehicle—and thus the components through which the operating media circulate—can be brought very quickly to their optimum operating temperature, even when the outside temperatures are low. Thus, energy losses as a result of operating temperatures that are not optimal are largely avoided, so that the hybrid motor vehicle can be operated with very low consumption and very low carbon dioxide emission.

A further advantage of the method according to the invention is based on the fact that dielectric heating requires only electric energy. In contrast to known heating methods which use waste heat of the internal combustion engine as energy source, the method according to the invention can therefore find application also when the hybrid motor vehicle operates in purely electric mode.

According to the invention, it is further provided to carry out a heating only when an ambient temperature of the motor vehicle is below a predefined threshold value. The latter is suitable selected such that under the prevailing environmental conditions, the operating medium is not heated up fast enough by friction losses, electrical power dissipation in the high-voltage battery or the like in order to avoid a significant increase in consumption.

In a particularly preferred embodiment of the invention, the operating medium to be heated is a coolant for a high-voltage battery of the motor vehicle. During prolonged operation, especially when high power consumption is involved, high-voltage batteries produce substantial amounts of heat and thus have to be actively cooled. When the motor vehicle is started in cold state or under similar conditions in which the high-voltage battery is significantly cooler than its optimum operating temperature, the active cooling system of the battery can also be used to heat it. In view of the high heating rate that can be achieved by dielectric heating, it is possible to bring the high-voltage battery very rapidly to its optimal operating temperature, so that the maximally possible power can be drawn in a shortest time. This allows operation of the hybrid motor vehicle in a purely electric mode, even immediately after the start or at especially cold ambient temperatures, without the need for the internal combustion engine to provide auxiliary propulsion energy. It is particularly useful hereby to integrate the dielectric heating device directly into the battery. This may find application especially with batteries with a so-called bottom plate cooling. In this way, it is possible to create a very compact construction.

In addition or as an alternative, other operating media of the motor vehicle can be dielectrically heated. This is particularly advantageous for lubricants of the motor vehicle, in particular for the transmission oil. Dielectric heating enables adjustment of the temperature-dependent viscosity of the transmission oil to the optimum value in an especially rapid manner, so that very little energy losses are encountered in the drive train as a result of internal friction of the lubricant.

In addition to a rapid initial heating after a cold start of the motor vehicle, the method can also be applied particularly useful in recuperation mode of the motor vehicle. In this operating mode, the motor vehicle is in thrust drive, with the electric driving engine acting as a generator and charging the high-voltage battery. Especially in this case, it is particularly important to reduce the friction losses in the drive train in order to recover a largest possible proportion of the kinetic energy or potential energy of the motor vehicle and to supply it to the high-voltage battery.

In a further advantageous embodiment of the invention, heating is executed, when an internal combustion engine of the motor vehicle is idle. In this operating mode, there exists hardly any unused waste heat that could be used to heat the operating medium, so that the use of dielectric heating is particularly energy efficient in this case.

Finally, it is particularly advantageous to use the high-voltage battery of the motor vehicle for supplying energy to the dielectric heating device. The high-voltage battery provides the necessary power to realize a particularly rapid heating of the operating medium.

BRIEF DESCRIPTION OF THE DRAWING

A preferred embodiment of the invention will now be explained in greater detail with reference to the drawing. It is shown in.

DETAILED DESCRIPTION OF PREFERRED EMBODIMENTS

Figure 1:
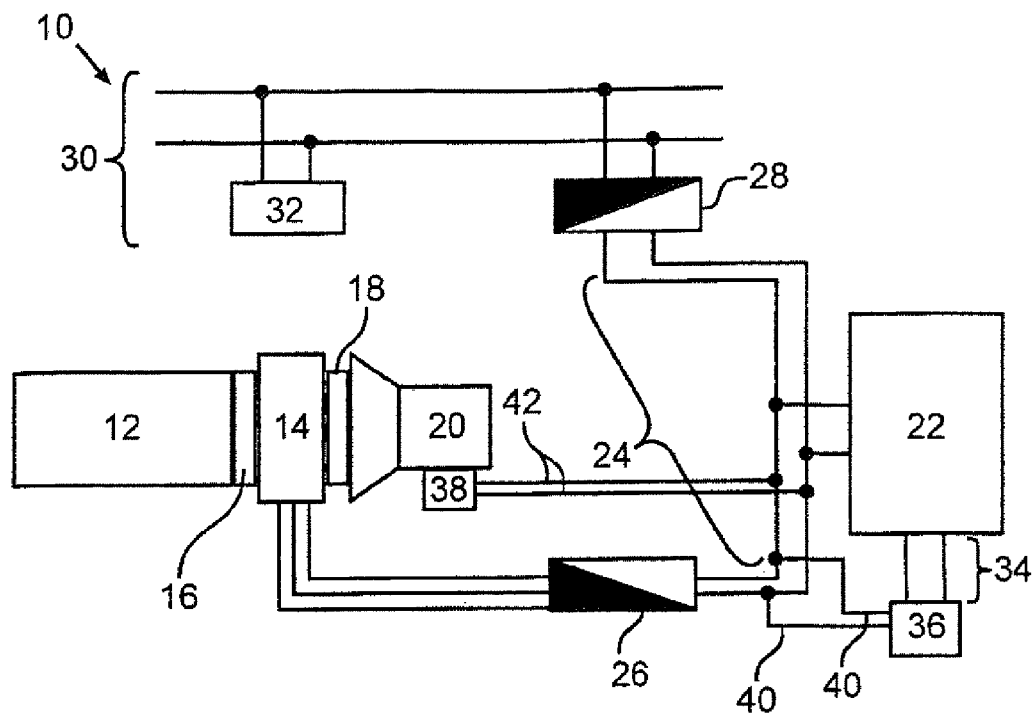
FIG. 1: a schematic representation of a drive system of a hybrid motor vehicle.

A drive system for a hybrid motor vehicle is designated generally by 10 and includes an internal combustion engine 12 and an electric drive engine 14. The internal combustion engine 12 can be coupled via a first clutch 16 to the electric drive engine 14 which in turn can be coupled via a second clutch 18 to an automatic transmission 20 which transmits the propulsion power via the remaining drive train, not shown in the Figure, to the wheels of the motor vehicle, also not shown.

The electric drive engine 14 is supplied with electric current from a high-voltage battery 22 which supplies an on-board high-voltage electrical system 24 of the motor vehicle 24. The voltage of the on-board high-voltage electrical system 24 is converted via an inverter 26 into the three-phase voltage necessary for the operation of the electric driving engine 24. A d.c. converter 28 further connects the on-board high-voltage electrical system 24 with a on-board low-voltage electrical system 30, which also has its own 12V battery 32.

Depending on the coupling state of the clutches 16, 18, different operating modes can be realized in the drive system. In addition to a pure combustion mode and a pure electric mode, both driving engines 12, 14 can also feed energy into the drive train at the same time. In this operating mode, the internal combustion engine 12 is operated at its optimum operating point, while the electric drive engine supplies the difference between the power delivered by the internal combustion engine 12 in this state and the actual required power. In the braking mode or when rollers are not powered along a downward slope, the electric driving engine 14 can be operated as a generator, so that kinetic or potential energy of the motor vehicle can be converted into electrical energy and used to charge the high-voltage battery 22.

When the drive system 10 operates in purely electrical mode, the internal combustion engine 12 does not provide waste heat that could be used for heating purposes. This is especially problematic during cold start of the motor vehicle at low outside temperatures, since the maximum power that can be drawn from the high-voltage battery 22 is greatly temperature-dependent. Under such conditions, a purely electrical operation is therefore possible only to a limited degree. To address this problem, a dielectric heating device in the form of a continuous microwave heater 36 is provided in a coolant circuit 34 of the high-voltage battery 22. As a result of dielectric heating of the coolant, the high-voltage battery 22 can be brought very quickly to its optimum operating temperature, so that a purely electric operation is possible even at low ambient temperatures. As an alternative to the embodiment shown in the Figure, the heating device 36 can also be integrated directly into the high-voltage battery 22 to provide a particularly compact version.

Figure 2:
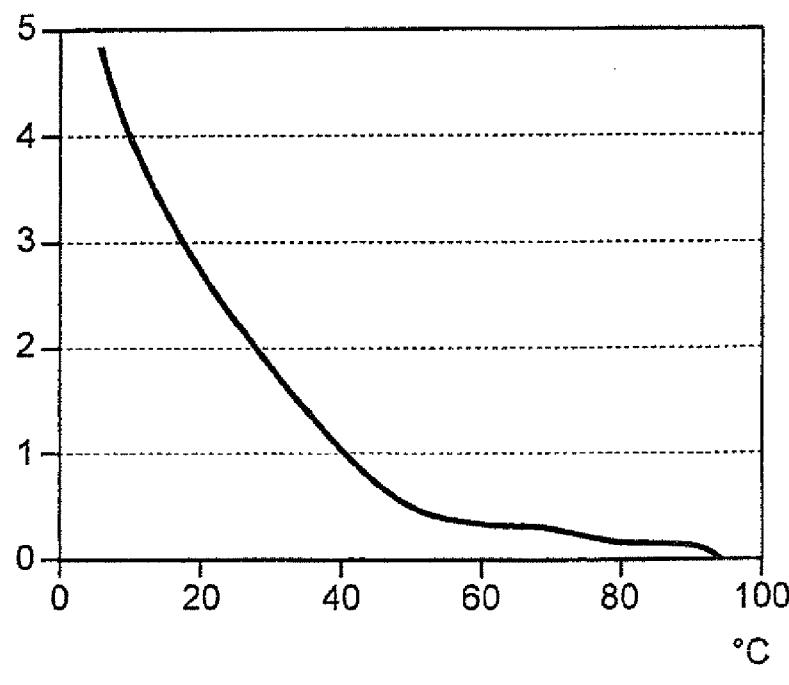
FIG. 2: a diagram illustrating the temperature dependence of the drag force of a motor vehicle.

A further dielectric heating device 38 is provided for heating a transmission oil of the transmission 20. As the transmission oil has a high viscosity at low temperatures, losses are experienced in such conditions in the transmission as a result of internal friction of the transmission oil. Drag forces caused by the viscosity of the transmission oil are plotted in FIG. 2 as a function of the oil temperature. As a result of the rapid and efficient heating of the transmission oil by the heating device 38, such viscosity-related losses can be reduced, so that a particularly energy-saving operation is possible, even immediately after a cold start of the motor vehicle.

Both dielectric heating devices 36, 38 are supplied with energy via respective lines 40, 42 from the on-board high-voltage electrical system 24. Their operation is therefore possible independent of the internal combustion engine 12, so that rapid heating of high-voltage battery 22 and transmission 20 is possible in every operating mode of the motor vehicle. The liquid spaces irradiated by the dielectric heating devices 36, 38 are furthermore suitably lined with metal which reflects the microwaves, so that the respective operating liquids are heated especially efficiently, and escape of microwave radiation into the environment is prevented.

What is claimed is:

1. A method of operating a motor vehicle, comprising:
ascertaining whether a cold start is present;
determining ambient temperature;
supplying an on-board high-voltage electrical system from a high-voltage battery of the motor vehicle;
in the presence of the cold start and when the ambient temperature falls below a predetermined threshold value, heating at least one operating medium, which is a coolant of the high-voltage battery of the motor vehicle, to a predefined desired temperature by a dielectric heating device through which the operating medium, that is the coolant of the high-voltage battery, flows and which is directly integrated into the high-voltage battery;
heating transmission oil of the motor vehicle as another operating medium by a further dielectric heating device, and
supplying energy to the dielectric device, which heats the coolant of the high-voltage battery, and to the another dielectric heating device, which heats the transmission oil, from the on-board high-voltage electrical system supplied from the high-voltage battery.

2. The method of claim 1, wherein the operating medium is heated in a recuperation mode of the motor vehicle.

* * * * *